United States Patent [19]

Fortune

[11] 4,030,360
[45] June 21, 1977

[54] SHOWER WATER TEMPERATURE MEASURING INSTRUMENT

[76] Inventor: Jeffrey L. Fortune, 3901 40 St. South, St. Petersburg, Fla. 33711

[22] Filed: Dec. 18, 1975

[21] Appl. No.: 641,883

[52] U.S. Cl. .............................. 73/349; 73/363.7; 73/431
[51] Int. Cl.² .................... G01K 1/08; G01K 13/02
[58] Field of Search ................ 73/349, 363.7, 431, 73/291; 138/104

[56] References Cited

UNITED STATES PATENTS

| 2,034,852 | 3/1936 | Wihgelm | 73/349 X |
| 2,534,378 | 12/1950 | Schlaich | 73/349 |
| 2,626,524 | 1/1953 | Harman | 73/349 X |
| 2,749,046 | 6/1956 | Schmitz | 73/363.7 X |
| 3,952,594 | 4/1976 | McMahan | 73/349 X |

Primary Examiner—Richard C. Queisser
Assistant Examiner—Daniel M. Yasich

[57] ABSTRACT

A temperature measuring instrument for measuring water temperature as it flows into the shower head of a personal bath. Measuring water temperature improves safety of showering, and provides for greater user comfort through precise display of temperature.

2 Claims, 4 Drawing Figures

U.S. Patent  June 21, 1977  4,030,360
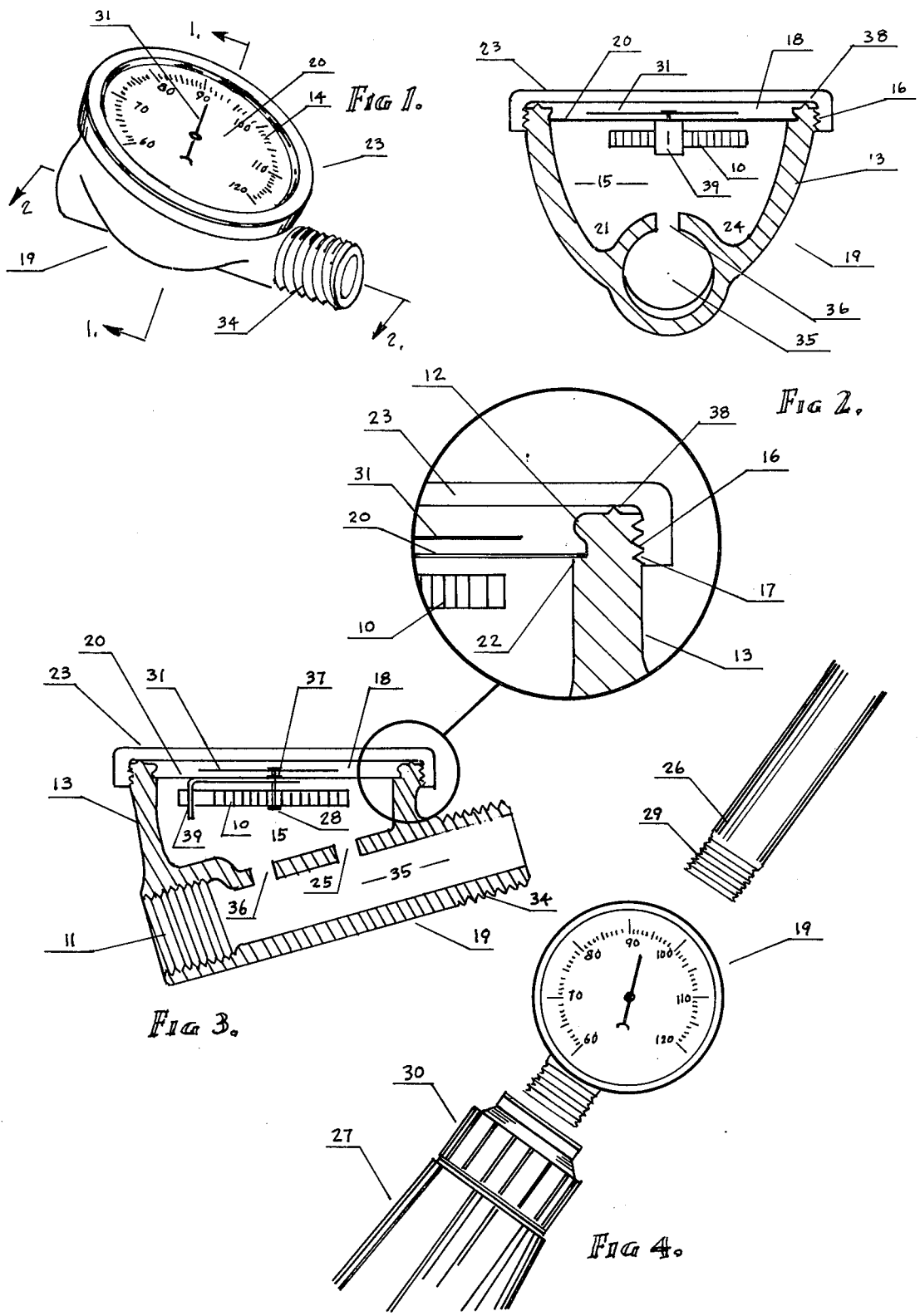

SHOWER WATER TEMPERATURE MEASURING INSTRUMENT

The present invention intervenes between a pipe (hereinafter referred to as a shower arm) installed in a shower to deliver water to a shower head, and the shower head. More particularly this invention connects directly to the shower arm allowing shower water from the shower arm to pass into the invention wherein the water temperature is measured and displayed as the result of the contraction or expansion of a bimetal coil which acts mechanically upon a display pointer, the water then continuing unimpeded in its flow through the invention into and through the shower head.

Shower wter, from human bathing, is generally a mixture of hot water (water hot enough to cause injury to human skin in the event of direct contact) and cold water (water of temperature lower than normal human comfort ranges). The hot and cold water are generally regulated as to flow through the use of the valves whose outlets feed pipes which lead directly to the shower arm.

Regulating the mixtures of hot and cold water for a shower, using currently available shower products, requires the insertion, for purposes of temperature measurement, of a portion of the human body into the unregulated stream of water and then opeating the valves in order to produce a flow of water which feels comfortable as it contacts that particular portion of the body thrust into it.

Additionally, since it is a known physiological fact that prolonged skin contact to high or low temperatures affects that portion of the skin's ability to accurately determine comfortable temperature for skin not previously immersed, water temperature adjusted in this manner may result in considerable discomfort when brought in contact with other portions of the body.

Another method is for the person regulating the water to place into the bath a hand held thermometer. Currently available liquid tube and bimetal thermometers react slowly because of their cases and thus have to be held in the shower water for an extended period, electronic thermometers are available which would register temperature very rapidly, but they are subject to damage as a result of the humid bath environment.

Accordingly, it is an object of this invention to provide a shower water temperature measuring instrument which displays the temperature with sufficient accuracy and reproducability to assure the user of the desired water temperature.

Another object is to provide a shower water temperature measuring instrument which is mechanically held in place within the shower system.

Another object is to provide a shower water temperature measuring instrument which does not restrict or in any way alter the flow of water to the shower head.

Another object is to provide a shower water temperature measuring instrument which displays the water temperature changes as they occur and as quickly as the normal man can detect such water temperature changes.

Another object is to provide a shower water temperature measuring instrument which displays the temperature clearly in a highly visible and readable fashion from those positions normally assumed by a human adjusting shower water temperature.

Another object is to provide a shower water temperature measuring instrument which, when installed, displays temperature on its dial with the numbers on the dial upright and straight.

Another object is to provide a shower water temperature measuring instrument which is sufficiently strong as to withstand water delivered at the highest reasonable water pressures and varying in a temperature from just freezing to just blow boiling without damage or leakage.

Another object is to provide a shower water temperature measuring instrument which may be easily installed by a homeowner or any other person possessed of no special training or mechanical skills, without special tools, jigs or fixtures.

Another object is to provide a shower water temperature measuring instrument which threads directly onto standard ½ inch tapered threaded shower arms and into ½ inch tapered threaded shower heads.

Another object is to provide a shower water temperature measuring instrument which is produced of materials which are chemically inert and do not effect the shower water purity.

Another object is to provide a shower water temperature measuring instrument which has an exterior appearance which is aesthetically pleasing and acceptable for visible use in baths.

Another object is to provide a shower water temperature measuring instrument which is manufactured of materials which retard the build up of chemical scale and limiting of the invention.

Another object is to provide a shower water temperature measuring instrument which is manufactured of components and materials which have an extended useful life and which are not subject to rapid deterioration in the liquid environment of the bath.

A further object is to provide a shower water temperature measuring instrument which is practically and economically feasible to manufacture.

Other objects of the invention will in part be obvious and will in part appear hereinafter.

In accordance with these objects the invention comprises a shower water temperature measuring instrument having a bimetal coil, pointer, dial and other mechanical components contained within the cavity of a molded housing pierced laterally by female and male pipe threads to permit attachment to shower arm and shower head respectively. That portion of the housing which encloses the dial and pointer is separately molded of a very clear plastic permitting easy viewing of the temperature displaying components.

The invention accordingly comprises those features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings:

FIG. 1 is a perspective view of the invention.

FIG. 2 is a cross sectional view taken along lines 1—1.

FIG. 3 is a cross sectional view taken along lines 2—2.

FIG. 4 is a plan view of the invention in assembly sequence with shower arm and shower head.

DISCUSSION OF THE PREFERRED EMBODIMENT

Referring now to the drawings in detail, there is illustrated in FIGS. 1 through 4, a temperature measuring instrument 19 comprising the invention.

The invention is preferably utilized in combination with a shower arm 26 and shower head 27, however, it is to be understood that it could be utilized with hand held shower devices or as an integral part of any fluid delivery system. The temperature measuring invention, generally indicated as 19 consists of a molded casing 13 having a female end 11 threaded to receive the male tapered pipe thread 29 of the shower arm 26, and a male thread end 34 provided to thread into the female portion 30 of a shower head 27, and a male thread opening 13 in its midsection which received a female thread lens 23 which creates a water tight assembly. The tubular cavity 35 provides for uninterrupted flow of liquid from the female end 11 out through the male end 34. As liquid flows through passage 35 it circulates through passages 36 and 25 into the first cavity 15 coming in intimate contact with the bimetal coil 10. The bimetal coil 10 is held in a fixed position at the end extending from the outer most coil by clip 39. The other end of the bimetal coil 10 at the center of the coaxial coil is affixed to shaft 28 which passes through the attaching hollow bearing 37, through the dial 20 into cavity 18. Attached to the end of shaft 28 is a pointer 31 which is rotated across dial 20 by the rotation of the shaft 28, reflecting the coiling and uncoiling of the bimetal coil 10.

Precise temperature is displayed in degrees by the graduations 14 printed onto the dial 20. The assembly of dial 20, pointer 31, shaft 28, bearing 37, clip 39 and bimetal coil 10 are held in position within cavity 15 by shelf 22 on its underside and by a small protrusion 12 on the upper side. This assembly is made visible through the lens 23 which screws onto the molded casing 13 with threads 16 and 17. A water tight seal is provided between the interface of the lens 23 and boyd 13 as a result of the compression of seal 38.

To reduce the weight of the invention and to reduce the amount of material required for its manufacture, cavities 18, 21 and 24 are formed into the invention. Advantageously, they are disposed so as not to adversely effect the structural strength of the invention.

It will thus be seen that the objects set forth above, among those made apparent from the preceding description, are efficiently attained end, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall there between.

Now that the invention has been described, what is claimed is:

1. Apparatus for measuring the temperature of flowing water attached at one end to a water pipe and disposed upstream to a shower nozzle relative to the flowing water comprising:

a molded casing means, a tubular cavity formed within said casing means and disposed for fluid connection of the water pipe with the shower nozzle, a first cavity formed within said casing means and disposed in spaced apart relation to said tubular cavity, at least one passage means interconnecting said tubular cavity with said first cavity, bimetal coil means with a bimetal coil disposed within said first cavity with the bimetal coil directly in fluid communication through said passage means with the flowing water, said bimetal coil means including a first and second end, connector means for mounting said first end of said bimetal coil within said first cavity shaft means attached to said second end, pointer means attached to said shaft means whereby rotation of said shaft means caused by coiling and uncoiling of said bimetal coil means rotates said pointer means, lens means disposed in water sealing attachment to said causing means, dial plate means disposed within said first cavity in spaced-apart relation to said lens means, said pointer means positioned between said dial plate means and said lens means, hollow bearing means disposed within said dial plate means and configured to receive said shaft means, said shaft means disposed in protruding relationship within said hollow bearing means, whereby said bimetal coil means coils and uncoils in response to variation in temperature of the flowing water, whereby said lens means is easily viewable to the user.

2. Apparatus as in claim 1 wherein said dial plate means further comprising numerical degrees printed thereon.

* * * * *